(12) United States Patent
Katsambas

(10) Patent No.: US 9,232,175 B2
(45) Date of Patent: Jan. 5, 2016

(54) GENERATING MULTIPLE SHOTS IN STORYBOARDING

(71) Applicants: SONY CORPORATION, Tokyo (JP); SONY PICTURES TECHNOLOGIES, INC., Culver City, CA (US)

(72) Inventor: Yiotis Katsambas, Encino, CA (US)

(73) Assignees: Sony Corporation, Tokyo (JP); Sony Pictures Technologies, Inc., Culver City, CA (US)

( * ) Notice: Subject to any disclaimer, the term of this patent is extended or adjusted under 35 U.S.C. 154(b) by 90 days.

(21) Appl. No.: 13/769,229

(22) Filed: Feb. 15, 2013

(65) Prior Publication Data

US 2013/0230299 A1 Sep. 5, 2013

Related U.S. Application Data

(60) Provisional application No. 61/605,541, filed on Mar. 1, 2012.

(51) Int. Cl.
| | |
|---|---|
| *G11B 27/00* | (2006.01) |
| *H04N 5/93* | (2006.01) |
| *G06F 9/46* | (2006.01) |
| *H04N 5/91* | (2006.01) |
| *H04N 21/84* | (2011.01) |
| *H04N 21/854* | (2011.01) |
| *G11B 27/034* | (2006.01) |

(52) U.S. Cl.
CPC ............... *H04N 5/91* (2013.01); *G11B 27/034* (2013.01); *H04N 21/84* (2013.01); *H04N 21/854* (2013.01)

(58) Field of Classification Search
USPC .................................................. 386/278–290
See application file for complete search history.

(56) References Cited

U.S. PATENT DOCUMENTS

| | | | | |
|---|---|---|---|---|
| 5,177,513 | A * | 1/1993 | Saito | 352/129 |
| 6,874,130 | B1 * | 3/2005 | Baweja et al. | 715/805 |
| 2004/0122971 | A1 | 6/2004 | Joshi et al. | |
| 2004/0130680 | A1 | 7/2004 | Zhou et al. | |
| 2007/0174412 | A1 * | 7/2007 | Araki | 709/213 |
| 2008/0133891 | A1 * | 6/2008 | Salz et al. | 712/220 |
| 2009/0013252 | A1 * | 1/2009 | DeWitt | 715/716 |
| 2011/0050860 | A1 | 3/2011 | Watson | |
| 2011/0157475 | A1 | 6/2011 | Wright et al. | |
| 2013/0073961 | A1 * | 3/2013 | Agnoli et al. | 715/716 |
| 2013/0125000 | A1 * | 5/2013 | Fleischhauer et al. | 715/723 |

OTHER PUBLICATIONS

Javed, et al., "A Framework for Segmentation of Interview Videos," Nov. 2000, IASTED International Conference on Internet Mulitmedia Systems and Applications, Las Vegas, NV, 6 pages.

* cited by examiner

*Primary Examiner* — Hung Dang
(74) *Attorney, Agent, or Firm* — Procopio, Cory, Hargreaves & Savitch LLP

(57) ABSTRACT

Storyboard processing in a movie during production, including: creating a proxy shot for an imported shot; displaying the proxy shot; receiving a completion signal for the imported shot; reloading related metadata for the imported shot; and displaying the newly imported shot. Keywords include proxy shot and imported shot.

13 Claims, 3 Drawing Sheets

GENERATING MULTIPLE SHOTS IN STORYBOARDING

CROSS-REFERENCE TO RELATED APPLICATIONS

This application claims the benefit of priority under 35 U.S.C. §119(e) of U.S. Provisional Patent Application No. 61/605,541, filed Mar. 1, 2012, entitled "Optimizing the Generation of Multiple Shots." The disclosure of the above-referenced application is incorporated herein by reference.

BACKGROUND

1. Field of the Invention

The present invention relates to storyboard processing, and more specifically, to processing and generating multiple shots in the storyboarding process of content production.

2. Background

In the process of making a movie, a storyboard is a pre-production process that is used to visualize scenes in detail. The storyboard expresses an image to be delivered as an illustration according to a sequence, illustrates a motion of camera and/or subject for each scene by visualizing the image to be presented to an audience and a customer. For example, the storyboarding process involves many panels of images drawn by a story artist, and presented in order for the purpose of visualizing sections of a motion picture prior to production. Typically, a completed storyboard includes the information that all staff, such as a producer, a director, and an art director may use to understand how to construct the corresponding story.

SUMMARY

The present invention provides for efficiently processing and generating multiple shots in the storyboarding process of content production.

In one implementation, a method of storyboard processing in a movie during production is disclosed. The method includes: creating a proxy shot for an imported shot; displaying the proxy shot; receiving a completion signal for the imported shot; reloading related metadata for the imported shot; and displaying the newly imported shot.

In another implementation, a system for storyboard processing is disclosed. The system includes: a multi-thread processor configured to process and generate a plurality of imported shots in parallel by creating multiple threads, wherein the multi-thread processor accepts the plurality of imported shots as input along with related metadata; a table of proxy shots, each proxy shot generated for each imported shot of the plurality of imported shots; a processor configured to update data for the each proxy shot corresponding to the each imported shot, and to reload the related metadata for the each imported shot; and a display to display the plurality of imported shots.

In yet another implementation, a non-transitory storage medium storing a computer program to process storyboard in a movie during production is disclosed. The computer program includes executable instructions that cause a computer to: create a proxy shot for an imported shot; display the proxy shot; receive a completion signal for the imported shot; reload related metadata for the imported shot; and display the newly imported shot.

Other features and advantages of the present invention will become more readily apparent to those of ordinary skill in the art after reviewing the following detailed description and accompanying drawings.

DETAILED DESCRIPTION

Certain implementations as disclosed herein provide a technique for efficiently processing and generating multiple shots in the storyboarding process of content production. After reading this description it will become apparent how to implement the invention in various implementations and applications. Although various implementations of the present invention will be described herein, it is understood that these implementations are presented by way of example only, and not limitation. As such, this detailed description of various implementations should not be construed to limit the scope or breadth of the present invention.

In one implementation, the solution involves a proxy empty shot generated to represent each shot and imported into a new storyboard processing system. Once each thread completes processing, a signal is sent to the storyboard processing system that the data has been updated for that proxy shot. The storyboard processing system reloads the shot data and displays the newly-imported shot.

In one implementation of the storyboard processing system, an import request accepts images as input along with other metadata. The storyboard processing system pre-processes the images to generate shots. It is possible to generate multiple shots with a single import request. It is also possible that multiple import requests are processing concurrently. However, it is essential that these shots are imported in the order it was defined during import. To speed up the importing of the shots, the processing is split into multiple threads which operate in parallel. However, if each shot imports as its pre-processing completes, then it is possible that shots could get imported out of order as the pre-processing time might vary between shots. In contrast, if the system waits until all the preprocessing completes before importing, it would not be able to provide direct feedback to the user. It would also keep the system from allowing concurrent imports. Accordingly, in one implementation, the storyboard processing system maintains the correct order even when shots are completed out of order.

A blank or proxy shot is generated for each imported shot and is displayed in the storyboard processing system. Once each thread completes processing, a signal is sent that the data has been updated for that proxy shot. The system refreshes and reloads all the related data for the shot and displays the newly imported shot.

Figure 1:
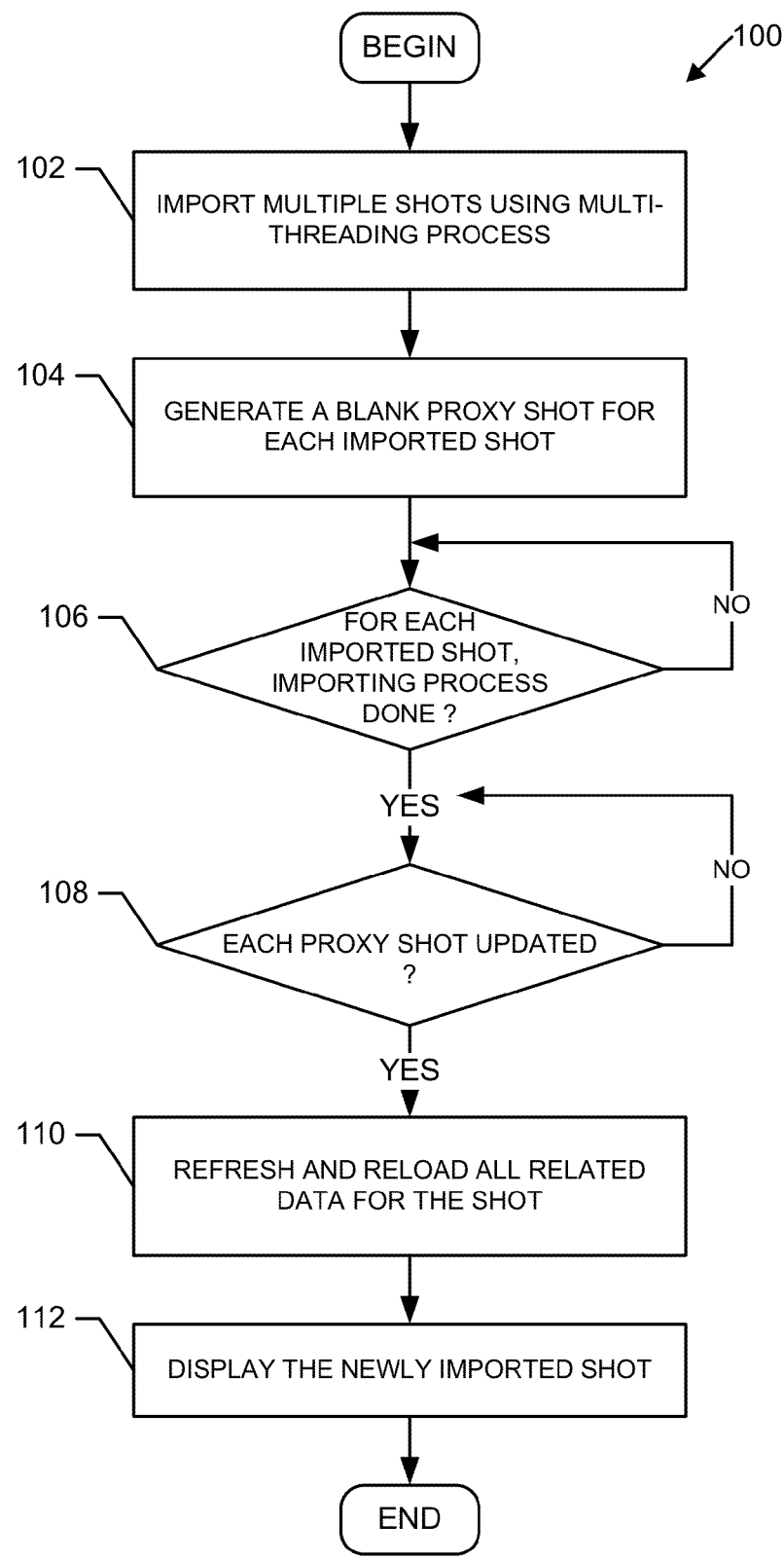
FIG. 1 is a flowchart illustrating a storyboarding process in accordance with one implementation of the present invention.

FIG. 1 is a flowchart illustrating a storyboarding process 100 in accordance with one implementation of the present invention. In this implementation, the process 100 provides a technique for efficiently processing and generating multiple shots in the storyboarding process of content production. In one implementation, efficient processing and generation of multiple shots is achieved by creating multiple threads that process shots in parallel in a storyboard processing system. Since the processing might complete out of order, a solution that maintains the correct order even when shots are completed out of order is used. Although the process 100, in the illustrated implementation, is used to manage, develop and/or analyze a story in motion picture, this technique can be modified to be used to develop and/or analyze a story in other areas, such as in computer games, commercials, TV shows, music videos, theme park rides, and in forensic visualization.

In the illustrated implementation of FIG. 1, the storyboarding process 100 involves an import request accepting images as input along with other metadata. The storyboarding process 100 pre-processes the images to generate shots. In one implementation, multiple shots are generated with a single import request. In another implementation, multiple import requests are processed concurrently. However, these shots should be imported in the order they were defined during import. To speed up the importing of the shots, the processing is split into multiple threads which operate in parallel. Thus, at box 102, multiple shots are imported using multiple thread processing. As described above, concurrent processing using multiple threading can result in shots getting imported out of order. Therefore, the storyboarding process 100 needs to maintain the correct order even when shots are completed out of order.

A blank or proxy shot is generated, at box 104, for each imported shot and is displayed in the storyboard processing system. Once each thread completes processing, at box 106, a signal is sent that the data has been updated for that proxy shot, at box 108. The process 100 refreshes and reloads all the related data for the shot, at box 110, and displays the newly imported shot, at box 112.

Figure 2:
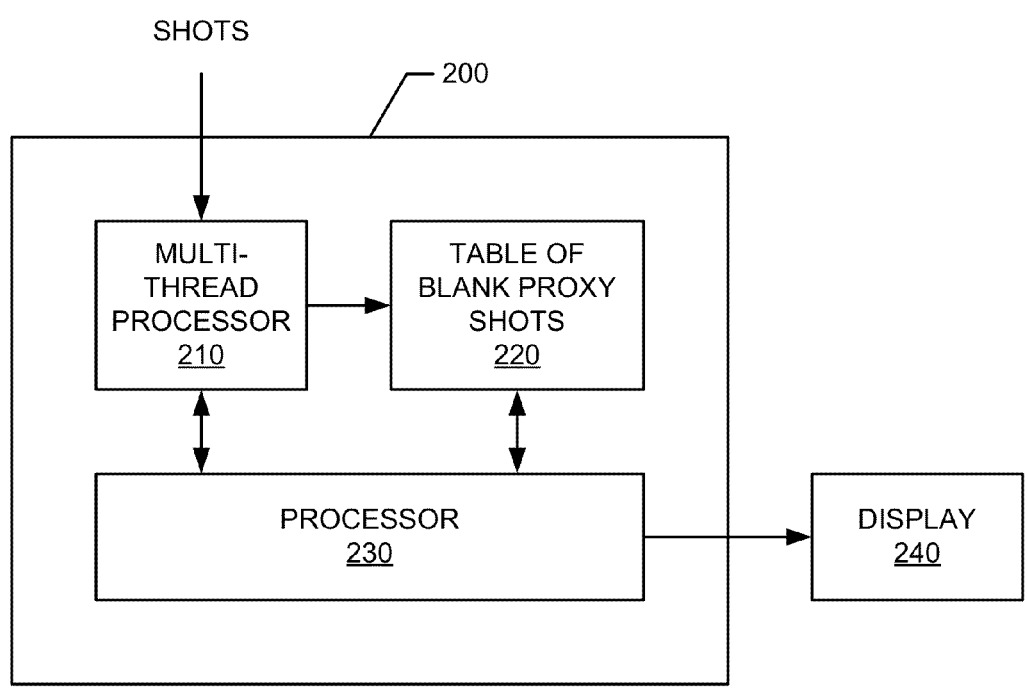
FIG. 2 is a functional block diagram of a storyboard processing system in accordance with one implementation of the present invention.

FIG. 2 is a functional block diagram of a storyboard processing system 200 in accordance with one implementation of the present invention. The storyboard processing system 200 includes a multi-thread processor 210, a table of blank proxy shots 220, and a processor 230. The system 200 displays the imported shots on a display 240. The multi-thread processor 210 is configured to perform efficient processing and generation of multiple shots by creating multiple threads that process shots in parallel.

In the illustrated implementation of FIG. 1, the multi-thread processor 210 imports and accepts images or shots as input along with other metadata. To speed up the importing of the shots, the multi-thread processor 210 splits the shots into multiple threads which operate in parallel to generate shots. As described above, concurrent processing using multiple threading can result in shots getting imported out of order. Therefore, the storyboard processing system 200 needs to maintain the correct order even when shots are completed out of order. This is accomplished by configuring a table of blank proxy shots 220, each proxy shot generated for each imported shot. Once each thread of the multi-thread processor 210 completes processing, a signal is received at the processor 230 to update the data for a corresponding proxy shot. The processor 230 refreshes and reloads all the related data for the shot in the table 220, and displays the newly imported shot on the display 240.

Figure 3A:
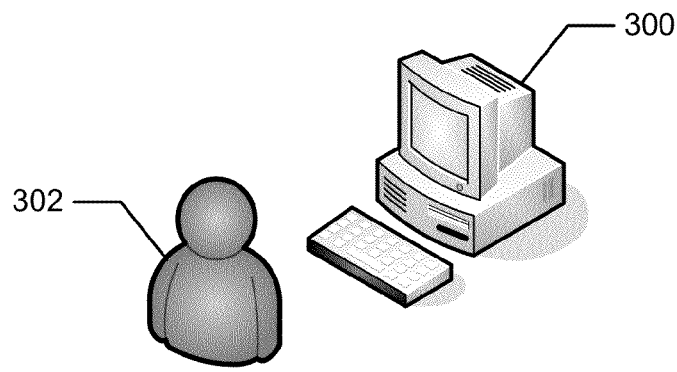
FIG. 3A illustrates a representation of a computer system and a user.

FIG. 3A illustrates a representation of a computer system 300 and a user 302. The user 302 uses the computer system 300 to perform various operations described with respect to FIGS. 1 and 2. Thus, the computer system 300 includes a storyboarding process 390 which is similar to the process 100 described in FIG. 1.

Figure 3B:
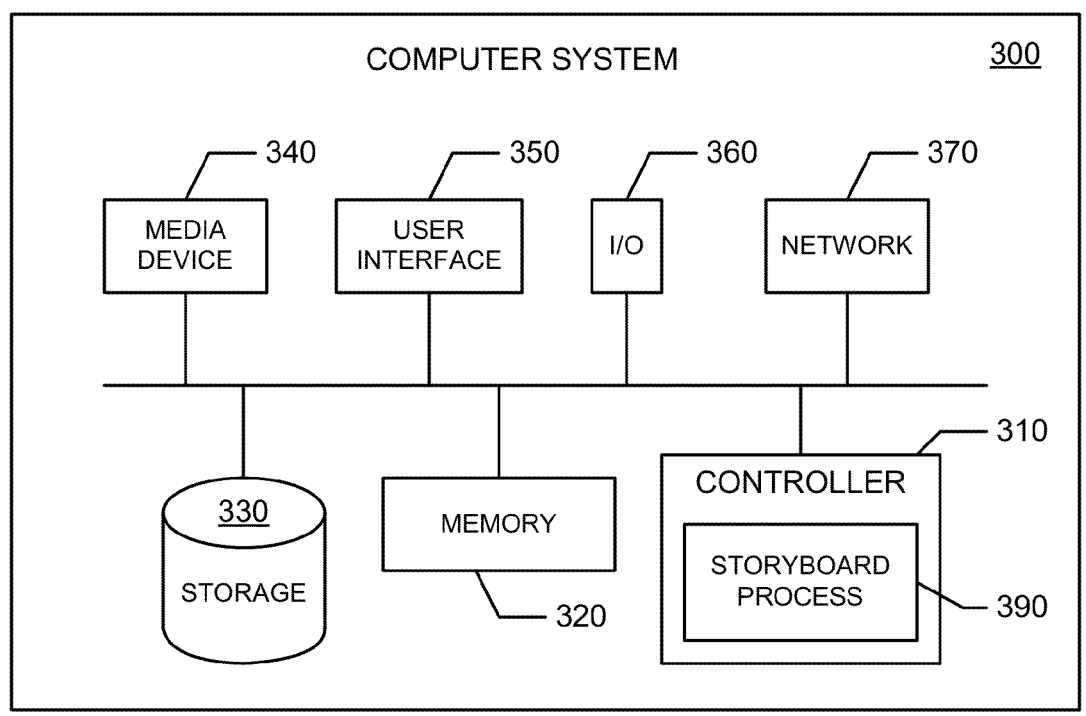
FIG. 3B is a functional block diagram illustrating the computer system hosting the storyboarding process including creating and managing the proxy shots and controlling the order of imports.

FIG. 3B is a functional block diagram illustrating the computer system 300 hosting the storyboarding process 390 including creating and managing the proxy shots and controlling the order of imports. The controller 310 is a programmable processor and controls the operation of the computer system 300 and its components. The controller 310 loads instructions (e.g., in the form of a computer program) from the memory 320 or an embedded controller memory (not shown) and executes these instructions to control the system. In its execution, the controller 310 provides the storyboarding process 390 as a software system. Alternatively, this service can be implemented as separate hardware components in the controller 310 or the computer system 300.

Memory 320 stores data temporarily for use by the other components of the computer system 300. In one implementation, memory 320 is implemented as RAM. In one implementation, memory 320 also includes long-term or permanent memory, such as flash memory and/or ROM.

Non-transitory storage 330 stores data for use by other components of the computer system 300, such as for storing data used by the storyboarding process 390. In one implementation, storage 330 is a hard disk drive.

The media device 340 receives removable media and reads and/or writes data to the inserted media. In one implementation, for example, the media device 340 is an optical disc drive.

The user interface 350 includes components for accepting user input from the user 302 and presenting information to the user 302. In one implementation, the user interface 350 includes a keyboard, a mouse, audio speakers, and a display. The controller 310 uses input from the user 302 to adjust the operation of the computer system 300.

The I/O interface 360 includes one or more I/O ports to connect to corresponding I/O devices, such as external storage or supplemental devices (e.g., a printer or a PDA). In one implementation, the ports of the I/O interface 360 include ports such as: USB ports, PCMCIA ports, serial ports, and/or parallel ports. In another implementation, the I/O interface 360 includes a wireless interface for communication with external devices wirelessly.

The network interface 370 includes a wired and/or wireless network connection, such as an RJ-45 or "Wi-Fi" interface (including, but not limited to 802.11) supporting an Ethernet connection.

The computer system 300 includes additional hardware and software typical of computer systems (e.g., power, cooling, operating system), though these components are not specifically shown in FIG. 3B for simplicity. In other implementations, different configurations of the computer system can be used (e.g., different bus or storage configurations or a multi-processor configuration).

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Accordingly, additional implementations and variations are also within the scope of the invention. Further, it is to be understood that the description and drawings presented herein are representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of storyboard processing multiple shots in a movie during production, comprising:
   creating a table of proxy shots,
   wherein each proxy shot of the table of proxy shots is created for each import shot of the multiple shots to be imported into storyboard processing using a multi-thread processor to perform concurrent processing,
   wherein each proxy shot includes a storage slot in the table;
   receiving a completion signal for said each import shot at a second processor;
   automatically loading data using the second processor for said each import shot into the storage slot of the table for said each proxy shot corresponding to said each import shot when the completion signal is received;
   automatically loading metadata using the second processor corresponding to said each import shot into the same storage slot of the table for said each proxy shot corresponding to said each import shot when the completion signal is received;
   updating the loaded data and loaded metadata of each import shot in the table using the second processor; and
   displaying the newly imported shots stored in the table of proxy shots.

2. The method of claim 1, further comprising
   requesting the multi-thread processor to import the multiple shots along with the metadata corresponding to the multiple shots.

3. The method of claim 1, wherein loading data for said each import shot into the storage slot of the table comprises
   maintaining a correct order of the multiple shots during the concurrent processing.

4. The method of claim 1, wherein each import shot imported into the storyboard processing is processed in a single thread of the concurrent processing in the multi-thread processor.

5. The method of claim 4, wherein said each proxy shot corresponding to said each import shot is updated when the processing of the single thread is completed.

6. A storyboard processing system, the system comprising:
   a multi-thread processor configured to process and generate a plurality of imported shots in parallel by creating multiple threads,
   wherein the multi-thread processor accepts the plurality of imported shots as input along with related metadata;
   a table of proxy shots, each proxy shot generated for each imported shot of the plurality of imported shots to be imported into storyboard processing using the multi-thread processor,
   wherein said each proxy shot includes a storage slot in the table;
   a second processor configured to automatically load data for said each imported shot corresponding to said each proxy shot into the storage slot of the table for said each proxy shot when a completion signal for each imported shot is received, to automatically load metadata corresponding to said each imported shot into the same storage slot of the table for said proxy shot when the completion signal for each imported shot is received, and to update the loaded data and loaded metadata of each import shot in the table; and
   a display to display the plurality of imported shots stored in the table of proxy shots.

7. The system of claim 6, wherein said each proxy shot corresponding to the each imported shot is processed in a single thread of multiple threads in the multi-thread processor.

8. The system of claim 7, wherein the second processor updates said each proxy shot corresponding to said each imported shot when the processing of the single thread is completed.

9. A non-transitory storage medium storing a computer program to process storyboard in a movie during production, the computer program comprising executable instructions that cause a computer to:
   create a table of proxy shots,
   wherein each proxy shot of the table of proxy shots is created for each import shot of the multiple shots to be imported into storyboard processing using a multi-thread processor to perform concurrent processing,
   wherein each proxy shot includes a storage slot in the table;
   receive a completion signal for said each import shot at a second processor;
   automatically load data using the second processor for said each import shot into the storage slot of the table for said each proxy shot corresponding to said each import shot when the completion signal is received;
   automatically load metadata using the second processor corresponding to said each import shot into the same storage slot of the table for said each proxy shot corresponding to said each import shot when the completion signal is received;
   updating the loaded data and loaded metadata of each import shot in the table using the second processor; and
   display the newly imported shots stored in the table of proxy shots.

10. The non-transitory storage medium of claim 9, further comprising executable instructions that cause a computer to
    request the multi-thread processor to import the multiple shots along with the metadata corresponding to the multiple shots.

11. The non-transitory storage medium of claim 9, wherein executable instructions that cause a computer to load data for said each import shot into the storage slot of the table comprises
    executable instructions that cause a computer to maintain a correct order of the multiple shots during the concurrent processing.

12. The non-transitory storage medium of claim 9, wherein each import of shots imported into the storyboard processing is processed in a single thread of the concurrent processing in the multi-thread processor.

13. The non-transitory storage medium of claim 12, wherein said each proxy shot corresponding to said each import shot is updated when the processing of the single thread is completed.

* * * * *